United States Patent [19]
Lafond et al.

[11] 3,859,694
[45] Jan. 14, 1975

[54] AERIAL CABLE CLAMP

[75] Inventors: Maurice Lafond, North Babylon; Robert E. Joslin, Lindenhurst, both of N.Y.

[73] Assignee: Plessey Incorporated, New York, N.Y.

[22] Filed: Mar. 7, 1974

[21] Appl. No.: 448,945

[52] U.S. Cl............................ 24/271, 24/273, 81/70, 81/68
[51] Int. Cl............................................. B65d 63/00
[58] Field of Search.......... 24/271, 270, 273, 69 ST, 24/69 R, 19; 81/68, 70, 66 A, 66 R, 64, 343; 214/523

[56] References Cited
UNITED STATES PATENTS

| | | | |
|---|---|---|---|
| 633,657 | 9/1899 | Muller | 24/270 |
| 1,389,515 | 8/1921 | Kikta | 81/68 |
| 1,470,161 | 10/1923 | Gray | 81/68 |
| 3,192,804 | 7/1965 | Petersen et al. | 81/66 R |

*Primary Examiner*—H. Hampton Hunter

[57] ABSTRACT

A clamp enabling repair and splicing equipment to be rigidly secured in spaced relation to overhead telephone cables. The cable is engaged between a pair of parallel V-blocks and a flexible strap, a locking handle intermediate the blocks securing the strap against the cable. The blocks also support a length of standard cable rack, to which splicing or repair equipment is secured.

15 Claims, 3 Drawing Figures

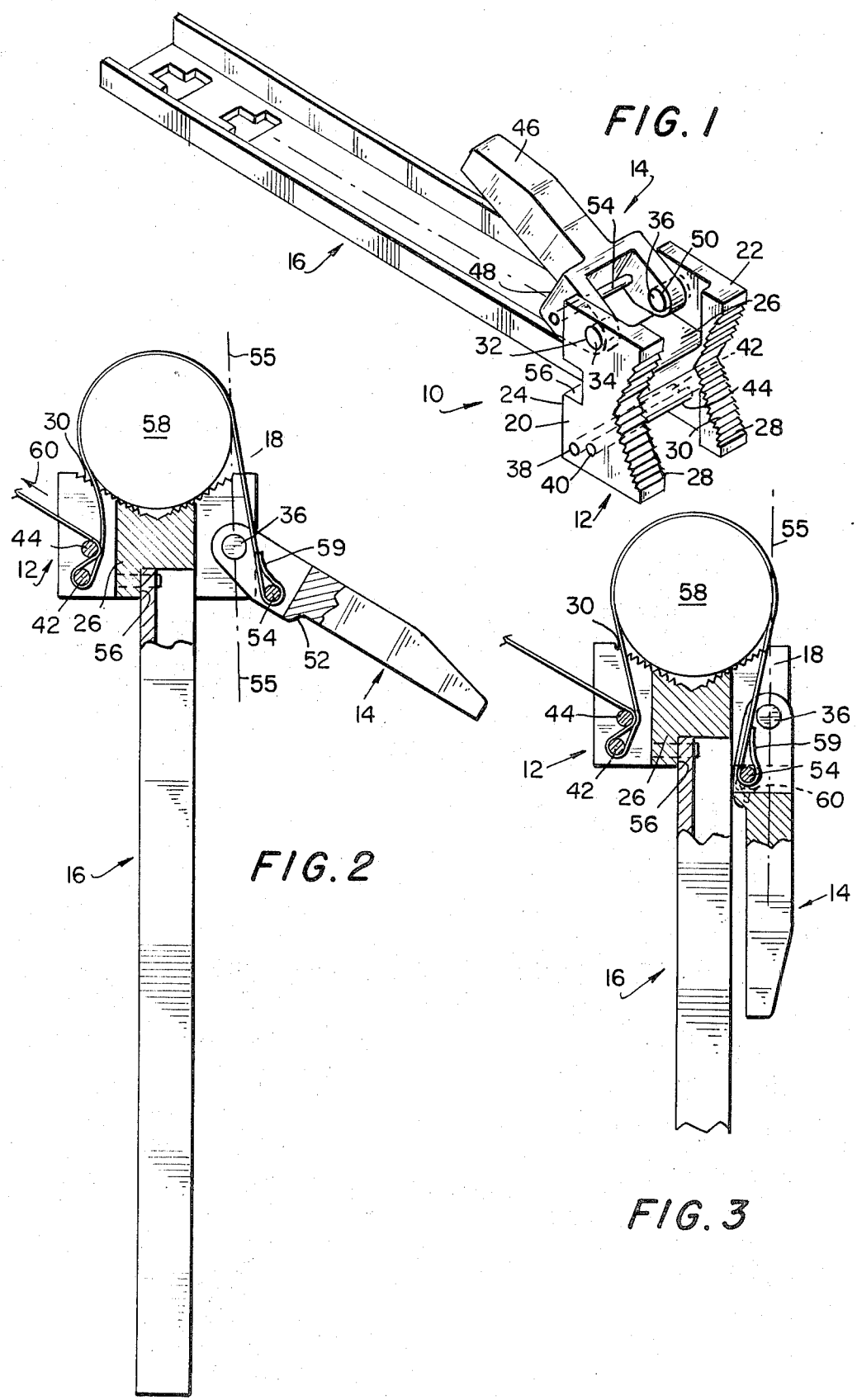

AERIAL CABLE CLAMP

BACKGROUND OF THE INVENTION

Automatic splicing equipment is greatly preferred in the installation and repair of telephone cables, because of the quality and uniformity of the splices produced thereby. In underground telephone cable installations, such automatic equipment may be rigidly secured between the standard cable racks which also support the cables. The splicing head is held in fixed, spaced relation to the cable on a bar secured to the racks, and splicing is carried out rapidly and economically. Generally, U-shaped, insulated, insulation-piercing jointing clips are employed to join the respective wire pairs.

With overhead telephone cables strung between poles, splicing is more difficult because the cable is not rigidly supported and is free to swing in the wind. Thus, while it is possible to provide a secure platform for the workman including such automatic equipment, cable movement prevents its efficient use. As a result, hand crimping tools have been preferred for work on overhead cables, in spite of the generally inferior splice produced.

U.S. Pat. Application Ser. No. 370,748, filed June 18, 1973 for "Splicing Head Mount" discloses preferred means for mounting a splicing head between cable racks, including a pair of clamps that secure a bar between individual racks, the splicing head being mounted on said bar. Said application is assigned to the same assignee as the instant application, and use of this mount with the present invention is preferred.

OBJECTS OF THE INVENTION

A general object of the present invention is to provide a cable clamp for use on overhead telephone cables.

Another object of the present invention is to provide clamp means capable of securing equipment in fixed, spaced relation to overhead telephone cables.

A further object of the present invention is to provide an aerial cable clamp which is simple, quick and easy to use.

Various other objects and advantages of the invention will become clear from the following description of a specific embodiment of the invention, and the novel features will be particularly pointed out in connection with the appended claims.

THE DRAWINGS

Reference will hereinafter be made to the accompanying drawings, wherein:

FIG. 1 is a perspective view of the aerial cable clamp of the present invention, but with the flexible strap portion not shown for clarity of illustration;

FIG. 2 and FIG. 3 are both cross-sectional elevation views of the clamp shown in FIG. 1 but including the flexible strap, with the locking handle in the open and locked positions, respectively.

DESCRIPTION OF EMBODIMENTS

An aerial cable clamp 10 in accordance with the present invention comprises four main parts, three of which are shown in FIG. 1: A clamping head 12, a locking handle 14 and a length of cable rack 16. Missing from FIG. 1 is the flexible strap 18 which is described hereinbelow in connection with FIGS. 2 and 3.

Clamping head 12 comprises a pair of spaced, parallel V-blocks 20, 22 connected by an intermediate, integral web portion 26 extending between the central portions of V-blocks 20, 22. The V-cut faces 28 of blocks 20, 22 have an included angle of about 120°, and should preferably be cut with a plurality of serations or knurling 30 so as to provide a high-friction, cable-gripping surface. Web portion 26 extends from faces 28 to lower edges 24.

V-blocks 20, 22 include three sets of aligned holes, all near the corners adjacent lower edges 24. In one corner a first set of coaxial holes 32, with suitable bushings (not shown), provide a mounting for two pivot pins 34, 36 which are employed for the pivotal mounting of locking handle 14, described below. In the opposite corner, two pairs of small coaxial holes 38, 40 are located in axial alignment in each block. Each pair serves to retain a knurled strap retainer pin 42, 44, the function of which is described below.

Locking handle 14 comprises a handle portion 46 and a yoke portion 48, the two portions cooperating in a general Y configuration. Pivot pins 34, 36 are journaled into corresponding holes 50 near the distal ends of yoke portion 48, so that, after assembly, locking handle 14 may be freely rotated about the axis of pivot pins 34, 36. The inwardly facing sides of yoke portion 48 (i.e., the sides nearest web portion 26) include an outwardly extending shoulder 52 (FIGS. 2 and 3). A pair of aligned holes in shoulder 52 on either side of yoke portion 48 are utilized to retain the strap mounting pin 54. The particular positioning of pin 54 and its relation to the axis of pivot pins 34, 36 is described hereinbelow.

Cable rack 16 may be formed integrally with clamping head 12 or it may be a separate part attached in any convenient manner to web portion 26 and extending outwardly therefrom. For example, an opening 56 (FIGS. 2 and 3) may be provided in web portion 26 and the end of rack 16 secured to a side thereof with a pair of screws (not shown). It is to be noted that rack 16 may have any desired configuration that will accomodate mounting means for automatic equipment. Since such equipments have heretofore been mounted on cable racks used to support underground cables, this is a desirable configuration.

Materials of construction are not important. Clamping head 12 and locking handle 14 may be fabricated from aluminum. Cable rack 16 is normally steel but any material hard enough may be employed. Transverse pins 42, 44 and 54 may be fabricated from drill rod stock.

In FIGS. 2 and 3, flexible strap 18 is shown in position, permanently secured around strap-mounting pin 54 between the respective sides of yoke portion 48. Strap 18 is wide enough to fit comfortably in this space and is generally between one and two feet long. It can be made of any suitable woven material, such as braided cotton, canvas, or a synthetic material having a high-friction surface. Strap 18 hangs free from pin 54 when the clamp 10 is not in use.

Operation of clamp 10 is illustrated in FIGS. 2 and 3, which includes a schematic representation of a cable in cross-section at 58.

The worker may face the cable, holding clamp 10 by rack 16 with locking handle 14 away from him. He reaches over cable 58 with free hand and picks up strap 18 and draws the free end of strap 18 inside and past retainer pins 42, 44, then he threads the free end of strap 18 around the bottom of pin 42 and inside of pin 44 pulling the free end in the direction shown by the arrow 60.

As he pulls the free end, V-cut faces 28 of clamping head 12 will be drawn into loose engagement with cable 58, and locking handle 14 will be drawn into the upward or open position shown in FIG. 2. At this point rack 16 can be adjusted to extend from cable 58 at any convenient angle.

With clamp 10 in desired position the worker (still holding rack 16 in one hand) uses the other hand to push handle 14 downwardly into the locked position shown in FIG. 3.

The wrap-around arrangement of strap 18 around knurled pins 42, 44 prevent any slippage of the strap during locking. As handle 14 is depressed to the lock position, it tensions strap 18 around cable 58 in a very rigid fashion (most cable coverings are slightly resilient, and strap 18 is observed to visibly compress them). More important, as the handle 14 is depressed, strap 18 passes through the axis of pivot pins 34, 36. At this point, tension on the strap is greatest, and moving past the axis eases the tension very slightly. This creates the locking action of the clamp, since once strap 18 is inside the axis of pins 34, 36 it tends to move further, until shoulder 52 hits web portion 26. Clamp 10 is thus secured to cable 58 and will remain in the preselected position until handle 14 is raised into the open position.

Expressed differently strap-mounting rod 54 is positioned so that it will reach a locking plane 55 at a point intermediate the respective open (FIG. 2) and closed (FIG. 3) positions of locking handle 14. Locking plane 55 is the plane which is tangent to the adjacent side of cable 58 and which passes through the axis of pivot pins 34, 36.

Securing strap 18 around strap-mounting rod 54 is preferably carried out by making a loop 59 in the end of strap 18, as by sewing or riveting. If this is done separately, it is assembled by inserting strap-mounting rod 54 through one side of yoke portion 48, loop 59 and then the other side of yoke 48. Alternatively, a loop can be formed by bending the downwardly extending end of strap 18 around the inside of pin 54, then outwardly and upwardly around the outside of pin 54, and securing the free end of strap 18 to the outwardly facing surface of strap 18 above pin 54.

It is important that the sewed or rivetted end of strap 18 forming loop 59 be on the outwardly facing side of strap 18 (i.e., the side of strap 18 away from web 26), as this enables strap 18 to extend from the inside of pin 54 to cable 58, thus passing through locking plane 55 earlier in the closing stroke and going farther beyond plane 55 in the closed position, than would be the case if the loop 59 were reversed. It will be appreciated that this enables a somewhat larger cable to be clamped than would otherwise be the case.

Alternative arrangements are of course possible; for example the end of strap 18 could be directly secured to the base of yoke 48, with the end thereof extending outwardly, as shown in phantom at 60 in FIG. 3 only. Or, it could extend around shoulder 52; in each case the plane of strap 18 during closing is about the same.

It is to be noted that all of the locking or unlocking operations described hereinabove may be carried out by the average worker in about 10 seconds.

With two clamps in place on either side of the work area, the splicing equipment (or whatever) is secured between the two racks 16 and work proceeds, with the equipment held in fixed, spaced relation to cable 58.

The present invention has been described as an aerial cable clamp, but it will be appreciated that it is not so limited; with one important qualification it can be used in underground or other environments. Reference to FIGS. 2 and 3 makes clear that the present invention is adapted for use with aerial cables 58 of nominal and limited diameter. The clamp could not be used on such large diameter cables as are sometimes used in underground locations that (a) V-faces 28 would not engage the cable and (b) pin 54 would not at least reach plane 55 when the handle is closed.

Various changes in the details, steps, materials an arrangements of parts, which have been herein described and illustrated in order to explain the nature of the invention, may be made by those skilled in the art within the principle and scope of the invention as defined in the appended claims.

What is claimed is:

1. A clamp for securing equipment to a cable comprising:
   clamping head means having a cable-engaging face;
   locking handle means pivotally secured on said clamping head means;
   flexible strap means secured on said locking handle means;
   strap retainer means on said clamping head means in opposed relation to said locking handle means; and
   equipment mounting means secured on said clamping head means on the side opposed to said cable-engaging face and extending outwardly therefrom.

2. The clamp as claimed in claim 1, wherein said clamping head means comprises a pair of spaced, parallel V-blocks connected by an integral web portion, the V-cut faces of said blocks comprising said cable-engaging face.

3. The clamp as claimed in claim 2, wherein said locking handle means comprises a handle portion and a yoke portion, a pair of pivot pins securing the distal ends of said yoke portion to said respective parallel V-blocks.

4. The clamp as claimed in claim 3, wherein said flexible strap means is secured on a rod transversely secured within said yoke portion and spaced from the axis of said pins.

5. The clamp as claimed in claim 4, and additionally comprising:
   said locking handle means having an open position and a closed position, said transverse rod being positioned so as to pass throught a locking plane intermediate said open and closed positions, said locking plane being the plane tangent to the adjacent side of a cable engaged by the V-cut faces of said blocks which passes through the axis of said pivot pins.

6. The clamp as claimed in claim 2, wherein said strap retainer means comprise a pair of spaced parallel rods extending between said V-blocks.

7. The clamp as claimed in claim 2, wherein said equipment mounting means comprises a bar secured to said web portion.

8. The clamp as claimed in claim 6, wherein said parallel rods have high-friction surfaces.

9. The clamp as claimed in claim 7, wherein said bar comprises a length of cable rack.

10. A clamp for securing equipment to a cable comprising:
- a clamping head including a pair of spaced, parallel V-blocks connected by an integral, intermediate web portion;
- a locking handle including a handle portion and an integral yoke portion;
- a pair of pivot pins pivotally securing the distal ends of said yoke portion between said parallel V-blocks adjacent said web portion;
- flexible strap securing means secured within said yoke portion in spaced relation to said pivot pin axis on the side of said yoke portion closest to said web portion;
- a flexible strap mounted on said strap securing means;
- said strap securing means being positioned so as to pass through a locking plane intermediate respective open and closed positions of said locking handle; said locking plane being the plane tangent to the adjacent side of a cable engaged by the V-cut faces of said blocks which passes through said pivot pin axis;
- strap retainer means extending between said V-blocks on the side opposed to said pivot pin axis; and
- an equipment mounting bar secured to said web portion and extending outwardly therefrom.

11. The clamp as claimed in claim 10, wherein said V-cut faces have an included angle of about 120° and high-friction surfaces.

12. The clamp as claimed in claim 10, wherein said strap securing means comprises a transverse rod extending across said yoke portion.

13. The clamp as claimed in claim 10, wherein said strap retainer means comprises a pair of spaced, parallel rods having high-friction surfaces.

14. The clamp as claimed in claim 12, wherein said strap is secured to said transverse rod by means of a loop in said strap, the end of said strap forming said loop being secured to the outwardly facing side of said strap when a cable is engaged by said strap.

15. The clamp as claimed in claim 10, wherein said flexible strap is secured directly to the base of said yoke portion by said strap securing means.

* * * * *